Nov. 13, 1934.  O. C. BOTZ  1,980,904

DRAWN AND DRESSED POULTRY OR FOWL

Filed July 1, 1931

Inventor
OTTO C. BOTZ
By Semmes & Semmes
Attorneys

Patented Nov. 13, 1934

1,980,904

UNITED STATES PATENT OFFICE 1,980,904

DRAWN AND DRESSED POULTRY OR FOWL

Otto C. Botz, Jefferson City, Mo.

Application July 1, 1931, Serial No. 548,249

3 Claims. (Cl. 17—11)

This invention relates generally to drawn and dressed poultry and fowl and more particularly to a method of preparing and shaping chickens.

It has been customary in the past to kill poultry by cutting the jugular vein and allowing all of the blood in the veins to flow from the body. After the blood has drained from the killed chicken or the like, it is picked and stored in a refrigerating apparatus to be kept until placed on the market. Poultry dressed in such a manner is generally known as "New York Dressed". Before poultry dressed in such a manner can be prepared for consumption, it is necessary to remove the head, feet and entrails and thoroughly wash the carcass.

Other methods of dressing fowl and poultry have been followed by the industry, such as entirely cleaning the bird before placing in cold storage. None of the prior methods have, to the best of my knowledge, included the removal of the backbone from chickens and the like after the head, neck, feet and entrails have been removed, and then flattening the carcass of the so-dressed chicken in such a manner that the legs may be folded over on the breast.

An object of my invention is to provide dressed and drawn fowl and poultry having the backbone removed.

Another object of my invention is to provide dressed and drawn fowl and poultry having the backbone removed and the legs folded and resting on the breast.

A further object of my invention is to provide dressed and drawn fowl or poultry having the backbone removed and a portion of the legs passed through a slit below the breast bone.

Yet another object of my invention is to provide dressed and drawn fowl or poultry with the backbone removed and flattened in such a manner that all edible flesh is readily accessible for consumption.

Still another object of my invention is to provide dressed and drawn fowl and poultry with the backbone removed and flattened to serve as a whole.

A still further object of my invention is to provide dressed and drawn fowl and poultry that is pleasing in appearance and served as a whole.

Yet a still further object of my invention is to prepare and shape a young chicken for consumption before its sexual organs have developed.

With these and other objects in view which may be incident to my improvements, the invention consists in the steps hereinafter set forth and claimed with the understanding that the several steps included may be varied without departing from the spirit of the invention and the scope of the appended claims.

The invention consists broadly in providing dressed and drawn fowl or poultry having the backbone removed, placed in a flattened position and the legs folded in such a manner that they rest on the breast and the edible parts are easily available for consumption.

In order to make my invention more clearly understood, I have shown in the accompanying drawing the shape of a dressed chicken formed in accordance with my invention. It is to be clearly understood that the shape shown in the drawing is not to be construed as the exact shape of the dressed chicken, as many variations in the manner of arranging the various parts may be made.

In the drawing forming a part of this specification;

Figure 1:
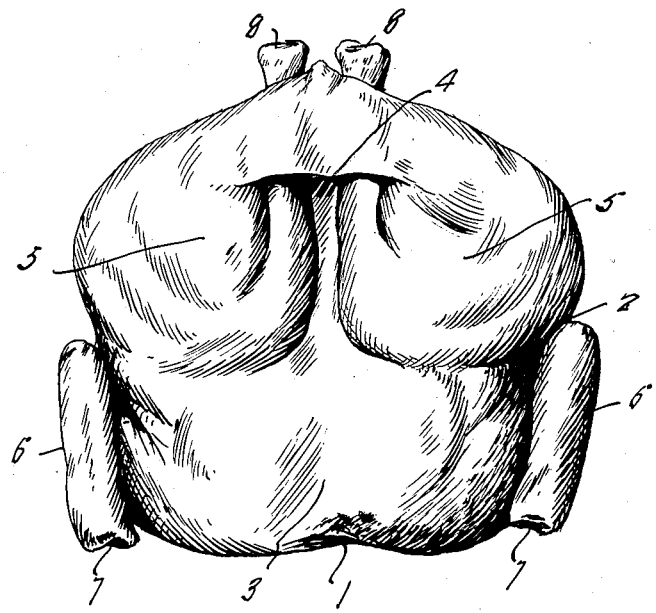
Figure 1 shows a chicken shaped in accordance with my invention and spread apart to lie in a flattened position.
Figure 2:
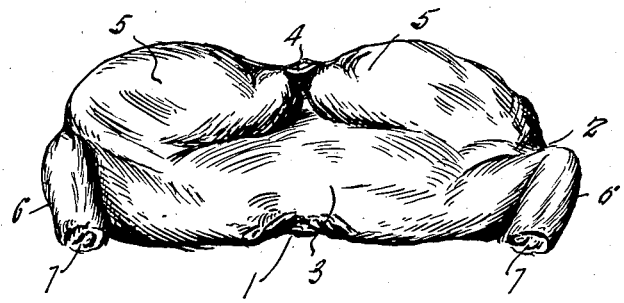
Figure 2 is an end view looking toward the dressed chicken at the part where the neck has been removed from the body.

In shaping fowl or poultry in accordance with my invention, the chicken or the like is first slaughtered, by cutting the jugular vein and allowing all the blood to drain from the body. After the blood has drained from the veins, the chicken is passed through a semi-scald machine, held at a constant temperature and picked to remove all features from the body. The picked chicken is then washed to remove all loose feathers. The head and neck are next removed, the neck being severed from the body at the point where it joins the shoulders, as indicated by numeral 1 in the drawing. The entrails are now removed and the chicken is split down the back and the backbone removed. The carcass may be washed at this point, but such washing is not necessary, as will hereinafter appear.

After the chicken has been split down the back and the backbone removed, it is formed into the shape shown in the drawing. The carcass of the chicken is spread apart so that each half of the bird lies apparently in the same plane.

Referring to the figures of the drawing, it will be noted that each side of the back 2 is adjacent to the breast 3 and that the back and breast are both in a flattened position and in approximately the same horizontal plane.

With the chicken in a flattened position, a slit 4 is made through the skin and adjoining flesh at a point adjacent to or immediately below the lower extremity of the breast bone. Both legs 5 are then folded over so that they rest on the breast of the chicken. The lower parts of the legs are passed through the slit 4 as is clearly indicated in Figure 1.

As will be noted from the drawing, the legs of the chicken are folded in such a manner that the fleshy parts of the legs are easily accessible for consumption after cooking.

By passing the lower part of the legs through the slit 4, they are held in a fixed position and will not spring upward from the chicken's breast as would be the case if no securing arrangement were provided for the legs.

The wings 6 are pressed close to the sides of the flattened chicken and remain in this position due to the manner in which they are joined to the body of the chicken. The lower tip of the wings may be clipped as at 7, but this step is not necessary and can be eliminated.

A chicken formed in the shape above described is then thoroughly cleaned with running water and all remaining traces of inner organs removed. The feet are severed from the legs at the joint indicated at 8 and the dressed and drawn chicken is ready for cooking.

If the dressed and drawn chicken is to be shipped as is usually the case, it is subjected to the action of a cooling medium in a refrigerating apparatus. I have found it desirable to first treat the chicken in a pre-chill chamber of a refrigerating apparatus to remove the remaining body heat and excessive body moisture.

Before passing to the freezing chamber of the refrigerating apparatus, the chicken may be wrapped in a suitable package and sealed, but I prefer to send the chicken to the freezing chamber without previously wrapping in a package. The chicken is now cooled or frozen to the preserving condition desired and placed in a suitable container for shipment to its destination. A cooling medium may be used in the container or if the chicken is to be shipped only a short distance, it will not be necessary to provide a cooling medium as the treatment within the refrigerating apparatus will be sufficient to preserve the chicken until its destination is reached.

It will be noted that a chicken shaped in accordance with this invention has many desirable features. When prepared, the legs remain in their fixed position and practically all of the edible meat is easily accessible for consumption. It is not necessary in serving a whole chicken to carefully manipulate eating utensils in order to obtain the desirable meat as this is made easily accessible by the particular shape in which the chicken is formed. Moreover, the bones remaining in the chicken are below the meat and do not interfere with severing it therefrom for consumption. Furthermore, in the cooking of a chicken shaped as described, the edible parts are exposed and receive the direct effect of the heat. This permits the chicken to be evenly cooked and presents a very pleasing appearance when served.

While my invention may be employed in preparing chickens of any size, I have found that a young chicken is most satisfactory. I prefer to use a chicken at an age before the sexual organs have developed and at the same time old enough to be absolutely edible. It is preferable to serve the chicken as a whole, but if a larger chicken is shaped in accordance with my invention, it may be cut in half or in any number of pieces desired.

While I have shown and described my invention as applied to a chicken, it is to be clearly understood that it comprehends the preparation and shaping of any fowl or poultry. In carrying out the invention, a continuous operation may be performed and a great number of chickens treated at one time. It is also to be clearly understood that many variations may be made in the steps of preparation and shaping without departing from the spirit of the invention or exceeding the scope of the appended claims. In the appended claims where only the word fowl is used, it is to be understood that poultry is also included as this invention comprehends the shaping of both.

I claim:

1. A drawn and dressed fowl having the backbone removed and its body stretched so that the entire fowl lies in a flattened position and a portion of the legs projecting through a slit below the breast bone.

2. A method of preparing fowl which comprises removing the entrails, splitting the fowl along the backbone, removing the backbone, spreading the fowl in a flattened position, folding the legs over a portion of the breast, and passing a portion of the legs through a slit below the breast bone.

3. A drawn and dressed fowl, having the backbone removed and its body stretched apart so that the entire fowl lies in a flattened position and in approximately the same horizontal plane, having the legs folded over a portion of the breast with the lower part of the legs projecting through a slit provided below the lower extremity of the breastbone, and having the wings pressed close to the sides of the fowl.

OTTO C. BOTZ.